United States Patent
Jansen et al.

[15] 3,656,341
[45] Apr. 18, 1972

[54] METHOD AND APPARATUS FOR TESTING RESILIENT OBJECTS FOR FLAWS

[72] Inventors: Günter Jansen, Bergisch-Neukirchen; Hans Kling, Cologne-Lindenthal, Germany

[73] Assignee: Goetzewerke Friedrich Goetze AG, Burscheid, Germany

[22] Filed: Mar. 11, 1970

[21] Appl. No.: 18,613

Related U.S. Application Data

[63] Continuation-in-part of Ser. No. 651,459, July 6, 1967, abandoned.

[30] Foreign Application Priority Data

July 6, 1966 Germany............................G 47,360

[52] U.S. Cl.................................................73/104
[51] Int. Cl..............................................G01n 27/82
[58] Field of Search................310/8.0, 8.1; 73/7, 9, 78, 73/104, 105

[56] References Cited

UNITED STATES PATENTS 2,733,598 2/1956 Miner.....................................73/105
3,071,247 1/1963 Paruolo et al.............................209/88
3,395,573 8/1968 Baker et al..............................73/105

OTHER PUBLICATIONS

Lauer et al., Device For Measuring Friction, Review of Scientific Instruments, April 1957, pp. 294 & 295.

Primary Examiner—Richard C. Queisser
Assistant Examiner—John P. Beauchamp
Attorney—Spencer & Kaye

[57] ABSTRACT

Flaws are located in the surface of a resilient material by moving a probe member across the surface and detecting variations in the position of the probe member which are caused by variations in friction between the probe member and the surface. The probe member is mechanically coupled to a piezoelectric transducer which translates variations of friction between the probe member and the resilient surface into variations of electrical potential. For testing shaft sealing rings, a pair of expansion rollers are mounted on either side of the probe member to radially expand the sealing ring where it is contacted by the probe member and therefore to enlarge any faults therein so that they will be easier to detect.

16 Claims, 6 Drawing Figures

INVENTORS
Günter Jansen
Hans Kling

By Spencer & Kaye

Attorneys 3,656,341

METHOD AND APPARATUS FOR TESTING RESILIENT OBJECTS FOR FLAWS

CROSS-REFERENCES TO RELATED APPLICATIONS

This is a continuation-in-part application to copending application Ser. No. 651,459, filed July 6, 1967, for a "Method and Apparatus for Testing Resilient Objects," now abandoned.

BACKGROUND OF THE INVENTION

The present invention relates to a method and apparatus for testing resilient objects such as shaft sealing rings or the like to detect faulty spots by means of a probe member.

In the manufacture of shaft sealing rings, the final inspection, particularly the testing of packing washers for faults, was previously accomplished manually. In feeling over the packing washer edges with the fingertips, only noticeable, larger faults could be detected. Fine cuts or cracks as well as differences in hardness of the resilient material near the sealing edge of the shaft sealing ring could not be detected by manual testing. Sealing rings having such faults were therefore used in machines and often became leaky after a short period of operation.

SUMMARY OF THE INVENTION

The object of the present invention is to provide a testing method and apparatus which possesses greater uniformity, reliability and above all greater sensitivity than the manual testing method, particularly for the testing of packing washers for shaft sealing rings.

The above-noted object is achieved by moving a probe member across and pressed into the surface to be tested and detecting flaws in the surface as a variation in the position of the probe member caused by a variation of friction between the probe member and the surface. The amount of deviation is a measure of the size of the fault. The packing washer is usually lubricated before or during the testing procedure to keep the friction and the resulting drift as low as possible.

The invention further provides apparatus for carrying out the above-noted measurement, the apparatus including a measuring head consisting of a probe member, a mechanical converter, and a piezoelectric transducer. A rocker bar is provided having the probe member at one end and the piezoelectric transducer at the other end. The probe member preferably consists of two spaced probe points adjacent to each other. It is, however, possible to use a probe in the shape of a needle having a circular cross section.

To improve the detection of faults in the area of the seal edge, it is further proposed to dispose the probe member between two successively arranged rollers. When the radial pressure exerted by the rollers on the packing washer is sufficiently high, the packing washer will be radially expanded. The resulting expansion, particularly of the packing washer edge, produces an enlargement of any flaws therein, which can then more easily and more precisely be detected by the probe member.

DESCRIPTION OF THE PREFERRED EMBODIMENT

Figures 1, 2:
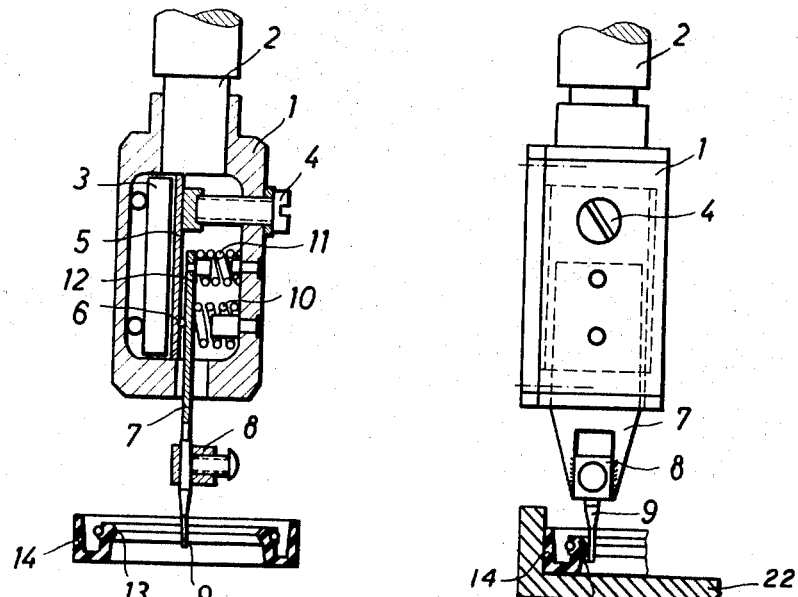
FIG. 1 is a cross-sectional elevational view of one illustrative embodiment of the invention.
FIG. 2 is an elevational view of the embodiment shown in FIG. 1 taken at right angles to the view shown in FIG. 1.

The embodiment shown in FIG. 1 is housed in a housing 1 which is connected to the testing instrument (not shown) via a bolt 2. A piezoelectric transducer 3 is clamped within the housing 1 by means of a screw 4. On the cover plate 5 of the piezoelectric transducer 3, a rocker bar 7 is pivotably disposed on a rocker pin 6. The rocker bar 7 consists of a plate whose end extending out of the housing 1 has a clamping holder 8 for insertion of the probe member 9. The rocker bar 7 is continuously pressed against the rocker pin 6 by compression spring 10 and the rocker pin 6 is continuously pressed against the cover plate 5 of the piezoelectric transducer 3. To engage the rocker pin 6, wedge-shaped grooves are provided in the cover plate 5 and in the rocker bar 7. A further compression spring 11 provides a continuous abutment, under a spring bias force arising from spring 11, of the inner rocker bar end 12 on the cover plate 5 of the piezoelectric transducer 3.

During the testing process, as is shown in FIG. 2, the packing washer edge 13 is moved past the probe member 9 under constant pressure by means of a rotatable fixture 22, which is only indicated partially in FIG. 2, but which can be any suitable prior art fixture for producing relative movement between the probe member 9 and the surface 13 to be tested.

Figure 3:
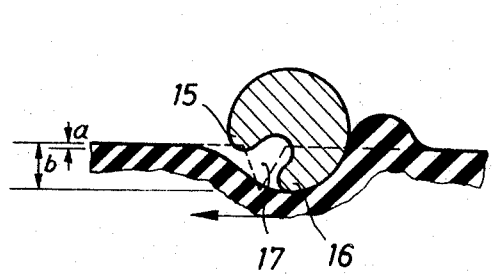
FIG. 3 is a cross-sectional view of one illustrative probe member of this invention.

FIG. 3 shows a cross section of the probe member 9, which is preferably provided with two feeler points 15 and 16. As shown, the cross section of the probe member is generally circular. The diameter may be, for example, between 0.7 and 1.0 millimeters. When the probe member is moved over the packing washer edge 13 of the shaft sealing ring 14, the feeler point 16, which is pressed into the edge 13, more deeply than point 15, opens up a faulty spot 17, which can be a cut or the like, and permits the sealing material to hit the feeler point 15 immediately thereafter. The two different levels of penetration of points 15 and 16 are shown by dimensions a and b in FIG. 3. In any given testing situation, there is a minimum penetration b below which cracks can not be discovered. This minimum penetration has been found to lie generally between 0.05 and 0.15 mm and at most about 0.2 mm. If the minimum penetration is not used, a probe member 9 tends to slide across a crack without there occurring a catching of the probe by the crack. The crack thus does not exert a sufficient frictional influence to be sensed. An exact determination of the actual size of the minimum penetration in millimeters is not always necessary, since, for a given geometry and material of sealing ring 14 and a given geometry of the probe member, there is a unique functional relationship between the normal force at the contact and the penetration $b$. Thus, control of testing may be alternatively achieved by, for example, strain gage sensing of the normal force existing between the probe member and the edge 13.

Figure 4:
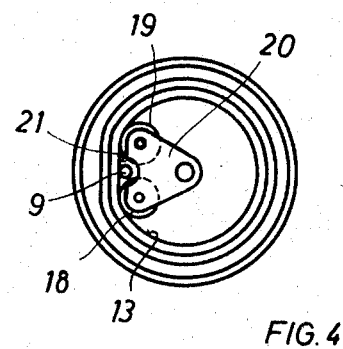
FIG. 4 is a plan view of a shaft sealing ring radially expanded by means of two rollers mounted on opposite sides of a probe member.

FIG. 4 illustrates how the packing washer edge 13 can be radially expanded in the area 21 where it contacts the probe member 9, by means of two cylindrical rollers 18 and 19 journaled to a plate 20, to achieve an enlargement of the faulty spot. The mounting of the probe member 9, which is shown only in section in FIG. 4, is to be understood to be according to FIGS. 1 and 2.

The present invention is based on the utilization of varying friction between sealing ring 14 and probe member 9 to detect flaws in the area of the packing washer edge 13. The relative movement created by fixture 22 is such that the friction creates torques on the rocker bar acting to pivot inner end 12 out of contact with the cover plate 5 of the transducer. When the probe member 9 is moved, under constant pressure, relatively over the packing washer edge 13, the friction between the parts remains substantially constant and end 12 remains in contact with cover plate 5, until a flaw 17 in the packing washer edge 13 is encountered. Flaws can be cuts, scratches, variations in hardness of the packing washer material, or the like. Such a flaw 17 initially causes the probe member 9 to be dragged forward in the direction of movement of edge 13. Since the probe member 9 is rigidly connected with the rocker bar 7, the rocker bar 7 pivots around the rocker pin 6 and its end 12 compresses the spring 11. The force of the spring rises above the bias force. If the force of the spring becomes greater than the frictional force at the moment, the probe member 9 jumps out of the flaw 17. The compression of spring 11 immediately forces the probe member 9 back into its original position. The end 12 of the rocker bar 7 therefore hits against the cover plate 5 of the piezoelectric transducer 3. The latter then converts the received mechanical impulse into an electrical impulse which is fed into an amplifier, which is not shown in the drawings. A relay can be connected to the amplifier output and thus, for example, the faulty ring can be ejected to be discarded. The decision as to whether a deviation is to be considered a flaw or not is almost exclusively made between probe member 9 and spring 11. The pressure of the probe member 9 on the packing washer edge 13 is assumed to be constant in the absence of flaws.

The probe member 9 springs back with a relatively high speed independently of the relative movement between the probe member and the packing washer edge. The testing procedure according to the present invention therefore permits a relatively high testing speed which is impossible with manual testing. The sensitivity of the apparatus of this invention is substantially dependent on the force characteristics of spring 11 and the cross-sectional configuration of probe member 9 as well as on the frictional conditions between probe member 9 and shaft sealing ring 14. The bias force of spring 11 depends on the Shore hardness of the resilient material being tested and increases with increasing Shore hardness. A particular characteristic of the apparatus of this invention is that it only indicates an exceeded threshold value. This is the main difference in comparison with sound reproduction heads as used, for example, in the reproduction of sound from phonograph records. The signal given out when the threshold value is exceeded varies only slightly between the minimum actuating value and that of a coarse fault. In this way, flaws of varying sizes can be detected, where the amount of deviation from the normal friction and the corresponding exceeding of the threshold value is a measure of the size of the flaw.

In order that cracks may be detected in accordance with the present invention, it is important that the probe member 9 be pressed into an edge 13 to a certain minimum penetration b in FIG. 3. Below this minimum penetration, cracks can not be detected.

The particular minimum penetration required varies as a function, for example, of the hardness of the resilient material of edge 13, the probe diameter and geometry and the spring bias force of spring 11. The minimum penetration required for a given situation can be determined by simple trial and error experiment as guided by the following specific example and other experience of the user.

EXAMPLE

A shaft sealing ring 14 was made of rubber having a Shore hardness of 70 ± 3. A probe member of the type illustrated in FIG. 3, whose circular cross section had a diameter of 1 millimeter, had to be pressed into edge 13 a penetration $b$ equal to 0.15 millimeters, before cracks could be discovered. The normal force between the probe member and the edge 13 was about 70 ponds (1 pond equals 1 gram times the acceleration of gravity in the c.g.s. system of units). The spring bias force exerted by spring 11 was 70 ponds.

Figure 5:
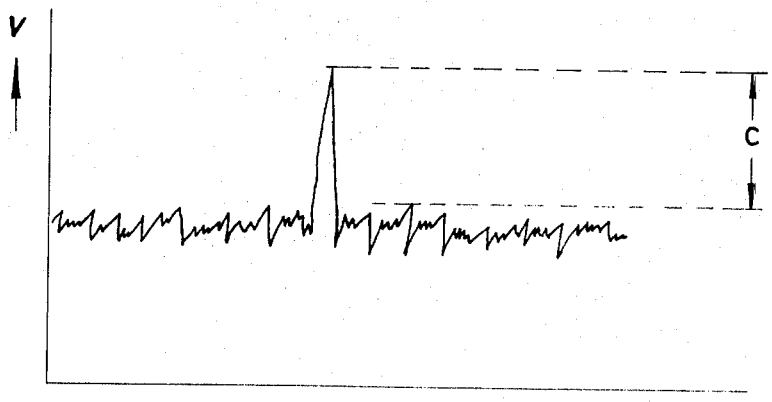
FIGS. 5 and 6 are voltage records obtained from scanning the edge of a shaft sealing ring.
Figure 6:
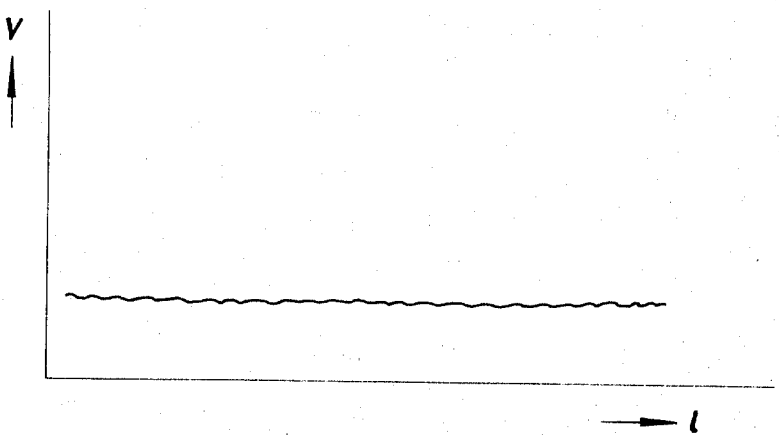

FIGS. 5 and 6 show voltage records from a piezoelectric crystal for a penetration of 0.15 mm, in the case of FIG. 5, and of 0.10 mm, in the case of FIG. 6, on the same ring 14. Only the record of FIG. 5 shows a voltage peak $c$ for a sensed peak, while that of FIG. 6 does not contain such a peak.

It will be understood that the above description of the present invention is susceptible to various modifications, changes and adaptations, and the same are intended to be comprehended within the meaning and range of equivalents of the appended claims.

We claim:
1. A method of testing the surface of a resilient material to detect flaws therein, comprising the steps of:
   a. pressing one end portion of an elongated probe member into the surface of said resilient material to a predetermined minimum penetration for detecting cracks and producing relative motion between said probe member and the surface of said resilient material for causing a flaw to drag said probe member in the direction of relative motion of said surface and to move the other end of the probe member away from a transducer;
   b. forcing said probe member eventually to jump out of a dragging flaw and back into its original position;
   c. whereby said other end of the probe member in moving back to its original position hits against the transducer to produce an impulse indicating the presence of a flaw.
2. The method as defined in claim 1 wherein the distance the probe is dragged from its normal position is a measure of the size of the flaw in said surface.
3. The method as defined in claim 1 wherein said resilient surface is lubricated before or during the producing of the relative motion.
4. A method of testing for flaws on the sealing surface of a seal made of elastic material, comprising the steps of:
   a. expanding at least a portion of said sealing surface;
   b. pressing one end of an elongated probe member into the expanded portion of said sealing surface to a predetermined minimum penetration for detecting cracks and producing relative motion between said probe member and said sealing surface for causing a flaw to drag said probe member in the direction of relative motion of said sealing surface and to move the other end of the probe member away from a transducer;
   c. forcing said probe member eventually to jump out of a dragging flaw and back into its original position;
   d. whereby said other end of the probe member in moving back to its original position hits against the transducer to produce an impulse indicating the presence of a flaw.
5. The method defined in claim 4, wherein said seal is a shaft sealing ring and said sealing surface is formed by the edge of said sealing ring.
6. Apparatus for testing for flaws on the sealing surface of a seal made of elastic material, comprising, in combination:
   a. probe means;
   b. means mounted on either side of said probe means for expanding at least a portion of the sealing surface;
   c. means for passing said probe means relatively over said portion of the sealing surface;
   d. means for mounting said probe means including spring biasing means whereby said probe means is dragged to a deflected position by a flaw in said sealing surface as said probe means is passed over said portion of the sealing surface and the probe means eventually jumps out of a dragging flaw and back to its original position when the force of said biasing means overcomes the drag force; and
   e. means for sensing the mechanical impulse of the probe means in moving back to its original position.
7. The apparatus defined in claim 6, wherein said seal is a shaft sealing ring and said sealing surface is formed by the edge of said sealing ring.
8. Apparatus for testing for flaws on the sealing surface of a seal made of elastic material, comprising, in combination,
   a. means for expanding at least a portion of the sealing surface, said expanding means including two rollers arranged to roll on said sealing surface;
   b. probe means including a probe member arranged between said rollers;
   c. means for passing said probe member over said portion of the sealing surface; and
   d. means, connected to said probe member, for sensing variation in friction between said probe member and said portion of said sealing surface.
9. Apparatus for testing the surface of a resilient material to detect flaws therein, comprising, in combination: a rocker bar having an inner end and an outer end, a mechanical probe member mounted on said outer end, a piezoelectric transducer means for creating an electrical impulse upon receiving a mechanical impulse, means for mounting said rocker pivotally about an axis situated between said inner and outer ends and with said inner end resting against a point on said transducer means the striking of which point creates an electrical impulse, means for maintaining the resting of said inner end against said point under a spring bias force, and means for providing a relative pressing of said probe member into the surface of a resilient material and for producing relative motion between said probe member and said surface, the direction of said relative motion being such that friction between the probe member and said surface creates torques on said rocker bar acting to pivot said inner end out of contact with said transducer means upon exceeding of said spring bias force.

10. Apparatus as defined in claim 9 wherein said mechanical probe member is formed with two adjacent, projecting feeler point means for engaging said surface at two different levels of penetration.

11. Apparatus as defined in claim 10 wherein said mechanical probe member comprises an elongated, needle-like member having a generally circular cross-sectional configuration.

12. Apparatus as defined in claim 9 further comprising means mounted on opposing sides of said mechanical probe member for expanding the part of said surface in contact with said probe member.

13. Apparatus for testing the surface of a resilient material to detect flaws therein, comprising, in combination: a rocker bar having an inner end and an outer end, a mechanical probe member mounted on said outer end, a piezoelectric transducer means for creating an electrical impulse upon receiving a mechanical impulse, means for mounting said rocker pivotally about an axis situated between said inner and outer ends and with said inner end resting against a point on said transducer means the striking of which point creates an electrical impulse, means for maintaining the resting of said inner end against said point under a spring bias force, and means for placing said probe member in contact with the surface of a resilient material and for producing relative motion between said probe member and said surface, the direction of said relative motion being such that friction between the probe member and said surface creates torques on said rocker bar acting to pivot said inner end out of contact with said transducer means upon exceeding of said spring bias force.

14. Apparatus as defined in claim 13 wherein said mechanical probe member is formed with two adjacent, projecting feeler point means for engaging said surface at two different levels of penetration.

15. Apparatus as defined in claim 14 wherein said mechanical probe member comprises an elongated, needle-like member having a generally circular cross-sectional configuration.

16. Apparatus as defined in claim 13 further comprising means mounted on opposing sides of said mechanical probe member for expanding the part of said surface in contact with said probe member.

* * * * *